UNITED STATES PATENT OFFICE.

CARL PAAL, OF ERLANGEN, GERMANY, ASSIGNOR TO KALLE AND COMPANY, OF BIEBRICH, GERMANY, A FIRM.

MANUFACTURE OF COLLOIDAL SILVER.

SPECIFICATION forming part of Letters Patent No. 701,606, dated June 3, 1902.

Application filed February 5, 1901. Serial No. 46,120. (No specimens.)

*To all whom it may concern:*

Be it known that I, CARL PAAL, doctor of philosophy, professor at the University of Erlangen, and a resident of Erlangen, Germany, have invented certain new and useful Improvements in the Manufacture of Colloidal Silver, of which the following is a specification.

It is known that the albuminous substances are decomposed by the action of warm dilute caustic alkalies. On dialyzing the products of this decomposition, as well as the albumoses, in aqueous alkaline solution stable alkali salts of these albumin derivatives are obtained. I have now succeeded in preparing from chlorid of silver by means of these alkali salts a new form of colloidal silver showing distinct properties.

I describe my new process by giving the following example; but I do not limit myself to the quantities and proportions given therein:

Ten parts, by weight, of an alkali salt of the decomposition products of albumins are dissolved in one hundred and fifty parts of water, adding forty parts of caustic-soda lye of twenty per cent. NaOH. Into the so-obtained clear liquid I pour, at a temperature of 70° to 80° centigrade, a concentrated aqueous solution of sixteen parts chlorid of silver, causing a thick heavy precipitate. I then heat this mixture on the water-bath, agitating continuously in order to prevent the precipitate from sticking to the inside of the vessel, until all is dissolved and until the color of the liquid, being dirty blackish-brown at the beginning, has changed into a bright yellowish-brown. The so-obtained liquid is cooled and then dialyzed against water in order to remove as much of the inorganic substances (caustic soda, sodium chlorid) as possible. The dialyzed liquid is then heated to 40° centigrade and completely precipitated by addition of acetic acid of thirty per cent. The precipitate is filtered, washed, suspended in water, and redissolved by a sufficient quantity of dilute caustic-soda lye. The so-obtained solution is again dialyzed, filtered, and evaporated by heating it gently at the open air or in a vacuum apparatus. In this manner I obtain a colloidal silver of eighty to ninety per cent. pure silver, consisting of bright scales showing a blue metallic luster and being very easily soluble in water. The metal is precipitated from its aqueous solution by addition of dilute acids. The so-obtained heavy precipitate is insoluble in water; but it is quite easily dissolved again by very dilute aqueous alkali solutions—caustic potash, caustic soda, ammonia, and even sodium carbonate. By this property the colloidal silver obtained by my process is distinctly different from colloidal silver otherwise prepared, which is also precipitated from its aqueous solutions by acids, but which completely loses by this treatment its solubility also in dilute alkalies.

Now what I claim is—

1. The new process of preparing colloidal silver by adding to an aqueous solution of the alkali salts of the decomposition products of albumins (formed by the action of warm dilute alkalies on albumins) caustic-soda lye and as much chlorid of silver as slightly exceeds the quantity corresponding to the alkali present, heating and redissolving completely the so-formed precipitate, dialyzing the liquid against water, precipitating it with a dilute acid, dissolving the precipitate in dilute caustic-soda lye, dialyzing the solution again and evaporating it.

2. As a new product the colloidal silver, containing up to ninety per cent. pure metal, consisting of bright scales showing a beautiful blue metallic luster, being very easily and completely soluble in water and distinguished by its property to retain its solubility in dilute aqueous alkalies even, after having been precipitated from its aqueous solutions by means of acids.

In testimony whereof I have signed my name to this specification in the presence of two subscribing witnesses.

CARL PAAL.

Witnesses:
 JEAN GRUND,
 IGNAZ ROSENBERG.